United States Patent
Chavez

(10) Patent No.: US 9,492,713 B1
(45) Date of Patent: Nov. 15, 2016

(54) SWIMMING ASSEMBLY

(71) Applicant: William Chavez, Waskom, TX (US)

(72) Inventor: William Chavez, Waskom, TX (US)

(*) Notice: Subject to any disclaimer, the term of this patent is extended or adjusted under 35 U.S.C. 154(b) by 0 days.

(21) Appl. No.: 14/692,928

(22) Filed: Apr. 22, 2015

(51) Int. Cl.
*A63B 31/14* (2006.01)
*A63B 31/12* (2006.01)
*A01K 29/00* (2006.01)

(52) U.S. Cl.
CPC ............... *A63B 31/12* (2013.01); *A01K 29/00* (2013.01)

(58) Field of Classification Search
CPC ................................. A63B 31/14; A63B 31/12
USPC ...................................................... 441/60–61
See application file for complete search history.

(56) References Cited

U.S. PATENT DOCUMENTS

| | | | | |
|---|---|---|---|---|
| 111,166 A | | 1/1891 | McAmity | |
| 1,059,443 A | * | 4/1913 | Cseki | A63B 31/14 441/60 |
| 1,130,209 A | * | 3/1915 | Sommerfeld | A63B 31/14 441/60 |
| 3,078,482 A | | 2/1963 | Crowder | |
| 3,290,707 A | * | 12/1966 | Montgomery | A63B 31/08 441/59 |
| 3,424,133 A | * | 1/1969 | Brady | A01K 15/027 119/702 |
| 4,756,699 A | * | 7/1988 | Brom | A63B 31/14 441/59 |
| D300,341 S | * | 3/1989 | Brom | D21/807 |
| 5,326,296 A | * | 7/1994 | De Jesus | A63B 31/11 441/60 |
| 5,749,759 A | | 5/1998 | Hopper | |
| D398,362 S | * | 9/1998 | Larmont | D21/806 |
| 6,364,727 B1 | * | 4/2002 | Rangel | A63B 31/12 441/59 |
| 7,285,030 B1 | * | 10/2007 | Houck | A63B 31/12 441/60 |
| 2002/0077010 A1 | * | 6/2002 | Lukas | A63B 31/08 441/59 |
| 2009/0280703 A1 | * | 11/2009 | Rachels | A63B 31/02 441/57 |

* cited by examiner

*Primary Examiner* — Lars A Olson
*Assistant Examiner* — Jovon Hayes

(57) ABSTRACT

A swimming assembly includes a plurality of fins worn on an associated one of legs of an animal when the animal swims. Each of the fins comprises a plate that is positioned against one of the animal's legs. A strap is attached to the plate to retain the plate on the animal's leg when the animal swims. A pair of wings is provided and each of the wings is movably coupled to the plate. Each of the wings is positioned in a deployed position to capture water when the animal urges the animal's leg rearwardly in the water thereby increasing the animal's ability to swim. Each of the wings is positioned in a stored position having each of the wings is positioned proximate the strap. Each of the wings is urged into the stored position when the animal urges the animal's leg forwardly in the water.

6 Claims, 3 Drawing Sheets

SWIMMING ASSEMBLY

BACKGROUND OF THE DISCLOSURE

Field of the Disclosure

The disclosure relates to swimming devices and more particularly pertains to a new swimming device for increasing an animal's ability to swim.

SUMMARY OF THE DISCLOSURE

An embodiment of the disclosure meets the needs presented above by generally comprising a plurality of fins and each of the fins may be worn on an associated one of legs of an animal when the animal swims. Each of the fins comprises a plate that is positioned against one of the animal's legs. A strap is attached to the plate to retain the plate on the animal's leg when the animal swims. A pair of wings is provided and each of the wings is movably coupled to the plate. Each of the wings is positioned in a deployed position having each of the wings extending laterally away from the plate. Each of the wings captures water when the animal urges the animal's leg rearwardly in the water. Thus, each of the wings is positioned in the deployed position thereby increasing the animal's ability to swim. Each of the wings is positioned in a stored position having each of the wings is positioned proximate the strap. Each of the wings is urged into the stored position when the animal urges the animal's leg forwardly in the water thereby reducing resistance of the wings with respect to the water.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
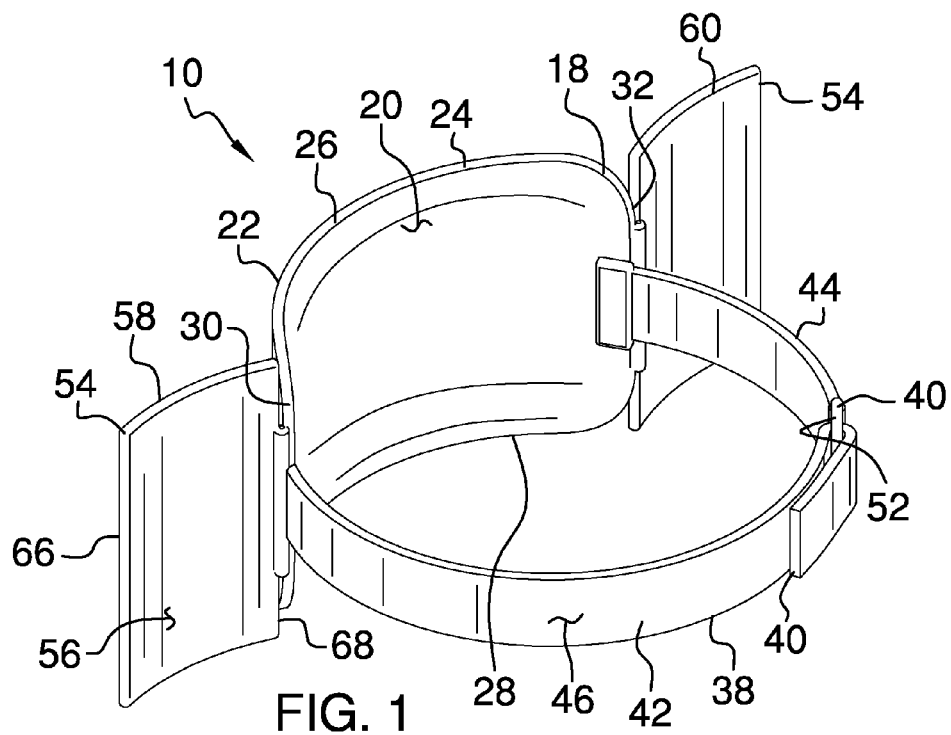
FIG. 1 is a perspective view of a swimming assembly according to an embodiment of the disclosure.
Figure 2:
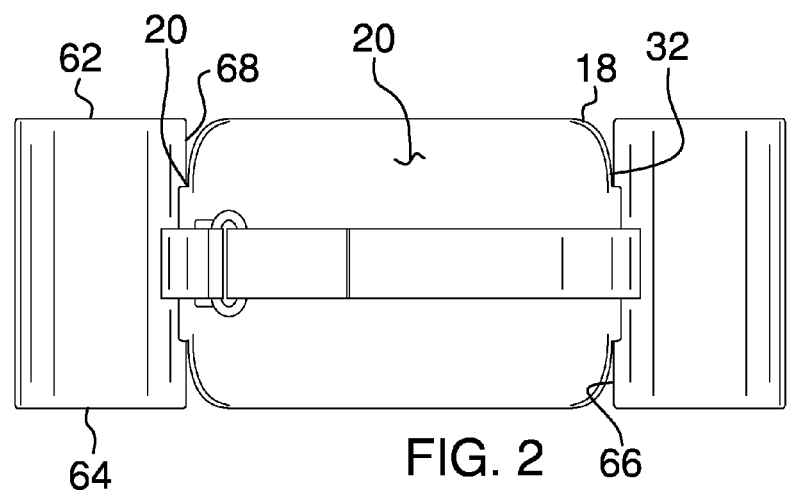
FIG. 2 is a back view of an embodiment of the disclosure.
Figure 3:
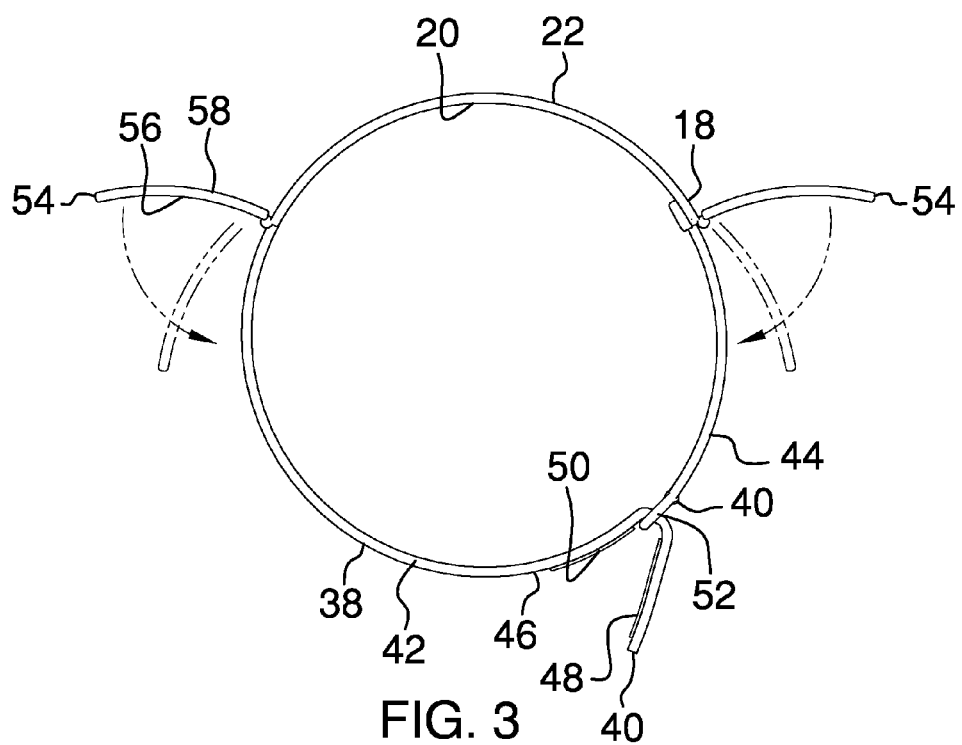
FIG. 3 is a top view of an embodiment of the disclosure.
Figure 4:
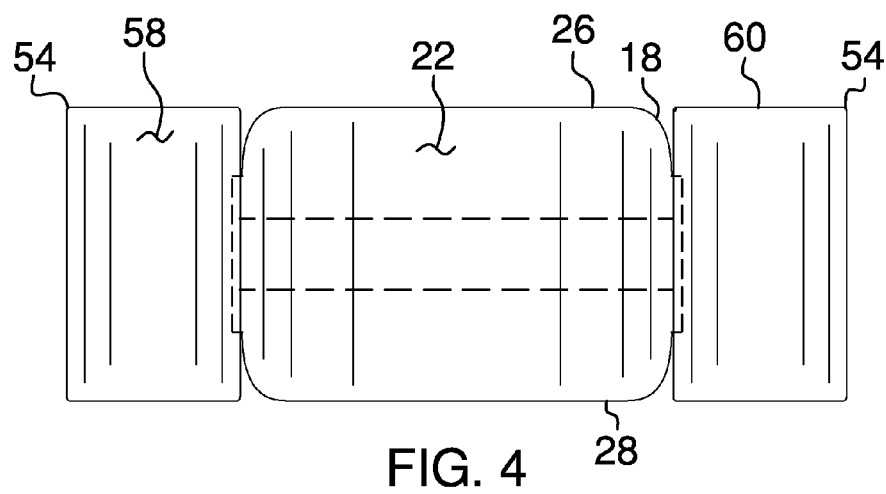
FIG. 4 is a front view of an embodiment of the disclosure.
Figure 5:
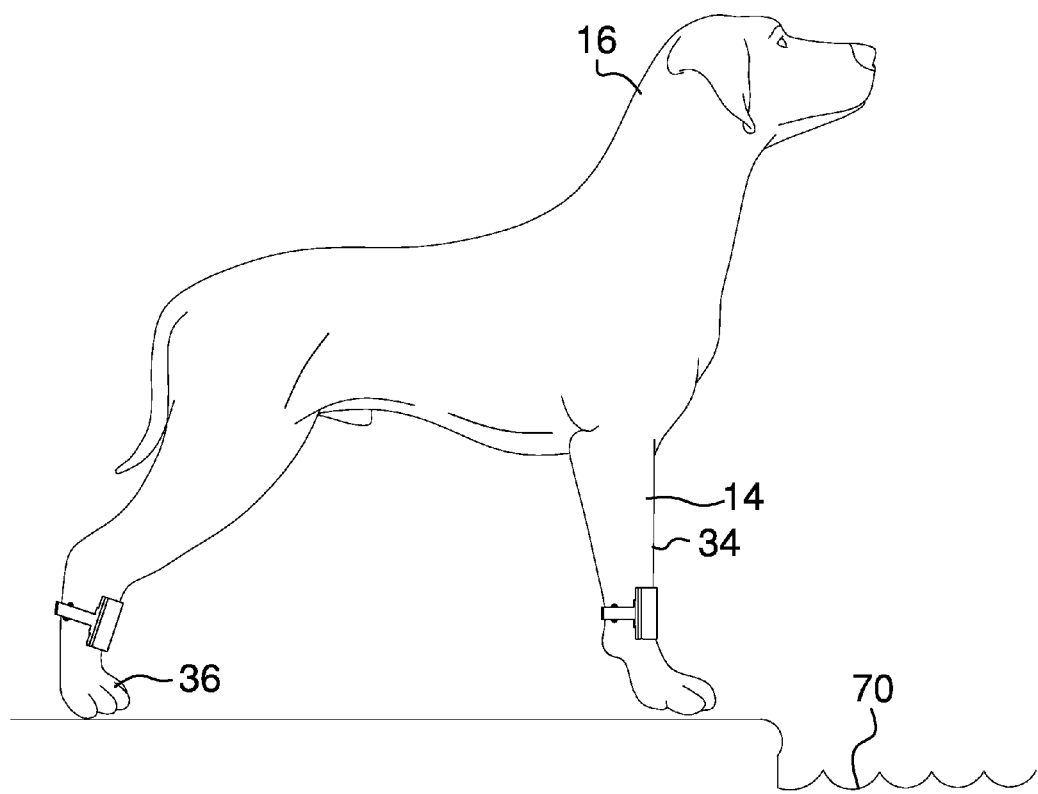
FIG. 5 is a perspective in-use view of an embodiment of the disclosure.

With reference now to the drawings, and in particular to FIGS. 1 through 5 thereof, a new swimming device embodying the principles and concepts of an embodiment of the disclosure and generally designated by the reference numeral 10 will be described.

As best illustrated in FIGS. 1 through 5, the swimming assembly 10 generally comprises a plurality of fins 12 that may each be worn on an associated one of legs 14 of an animal 16 when the animal 16 swims. The animal 16 may be a dog or the like and each of the fins 12 comprises a plate 18 has a front surface 20, a back surface 22 and a peripheral edge 24 extending between the front surface 20 and the back surface 22. The peripheral edge 24 has a top side 26, a bottom side 28, a first lateral side 30 and a second lateral side 32. Each of the front surface 20 and the back surface 22 is concavely arcuate between the first lateral side 30 and the second lateral side 32. Thus, the plate 18 has a U-shaped cross section taken perpendicular to a line extending between the top side 26 and the bottom side 28. The plate 18 is positioned against one of the animal's legs 14 having the front surface 20 abutting a front side 34 of the animal's leg 14. Additionally, the plate 18 is positioned adjacent to an associated one of a foot 36 of the animal 16.

A strap 38 is attached to the plate 18 and the strap 38 extends between the first lateral side 30 and the second lateral side 32. The strap 38 is split to define a distal end 40 of each of a first portion 42 and a second portion 44 of the strap 38 with respect to the plate 18. The first portion 42 has an outer surface 46 and a first coupler 48 and a second coupler 50 are each coupled to the outer surface 46. The first coupler 48 is positioned adjacent to the distal end 40 of the first portion 42 and the second coupler 50 is spaced from the first coupler 48. The first 48 and second 50 couplers are complementary with each other and each of the first 48 and second 50 couplers may comprise a hook and loop fastener. A buckle 52 is coupled to the distal end 40 of the second portion 44. The distal end 40 of the first portion 42 is extended through the buckle 52 and the first coupler 48 engages the second coupler 50. Thus, the distal end 40 of the first portion 42 is matable with the distal end 40 of the second portion 44 wherein the strap 38 retains the plate 18 on the animal's leg 14 when the animal 16 swims.

A pair of wings 54 is provided and each of the wings 54 has a forward surface 56, a rearward surface 58 and a perimeter edge 60 extending between the forward surface 56 and the rearward surface 58. The perimeter edge 60 of each of the wings 54 has an upper side 62, a lower side 64, a first side 66 and a second side 68. Each of the forward surface 56 and the rearward surface 58 of each of the wings 54 is concavely arcuate between the first side 66 and the second side 68. The second side 68 of one of the wings 54 is hingedly coupled to the first lateral side 30 of the plate 18 and the first side 66 of one of the wings 54 is hingedly coupled to the second lateral side 32 of the plate 18.

Each of the wings 54 is positioned in a deployed position having each of the wings 54 extending laterally away from the plate 18. The rearward surface 58 of each of the wings 54 captures water 70 when the animal 16 urges the animal's leg 14 rearwardly in the water 70. Thus, each of the wings 54 is positioned in the deployed position thereby increasing the animal's 16 ability to swim. The forward surface 56 of each of the wings 54 forms an angle ranging between approximately 30° and 40° with respect to the back surface 22 of the plate 18 when the wings 54 are placed in the deployed position. Each of the wings 54 is positioned in a stored position having each of the wings 54 being positioned proximate the strap 38. Each of the wings 54 is urged into the stored position when the animal 16 urges the animal's leg 14 forwardly in the water 70 thereby reducing resistance of the wings 54 with respect to the water 70.

In use, each of the fins 12 is attached to an associated one of the animal's legs 14 when the animal 16 is going to swim.

The front surface 20 of the plate 18 is abutted against the front side 34 of the associated animal's leg 14 and the strap 38 is secured around the animal's leg 14. Each of the wings 54 on each plate 18 is urged into the deployed position when the animal 16 strokes each of the animal's legs 14 rearwardly in the water 70. Thus, the animal 16 is able to generate greater momentum while the animal 16 swims. Each of the wings 54 on each plate 18 is urged into the stored position when the animal 16 strokes each of the animal's legs 14 forwardly in the water 70. Thus, the wings 54 do not add additional resistance when the animal's legs 14 are stroked forwardly in the water 70.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A swimming assembly configured to be worn by an animal thereby improving the animal's ability to swim, said assembly comprising:
   a plurality of fins, each of said fins being configured to be worn on an associated one of legs of an animal when the animal swims, each of said fins comprising
      a plate being configured to be positioned against one of the animal's legs, wherein said plate has a front surface, a back surface and a peripheral edge extending between said front surface and said back surface, said peripheral edge having a top side, a bottom side, a first lateral side and a second lateral side, said front surface being continuous and smooth extending between said first lateral side and said second lateral side wherein said front surface is configured for being positioned against the animal without catching on fur of the animal,
      a strap being attached to said plate wherein said strap is configured to retain said plate on the animal's leg when the animal swims, and
      a pair of wings, each of said wings being movably coupled to said plate, each of said wings being positioned in a deployed position having each of said wings extending laterally away from said plate, each of said wings being configured to capture water when the animal urges the animal's leg rearwardly in the water such that each of said wings is positioned in said deployed position thereby increasing the animal's ability to swim, each of said wings being positioned in a stored position having each of said wings being positioned proximate said strap, each of said wings being configured to be urged into said stored position when the animal urges the animal's leg forwardly in the water thereby reducing resistance of said wings with respect to the water.

2. The assembly according to claim 1, further comprising each of said front surface and said back surface being concavely arcuate between said first lateral side and said second lateral side such that said plate has a U-shaped cross section taken perpendicular to a line extending between said top side and said bottom side.

3. The assembly according to claim 2, wherein said strap extends between said first lateral side and said second lateral side, said strap being split to define a distal end of each of a first portion and a second portion of said strap with respect to said plate, said distal end of said first portion being matable with said distal end of said second portion.

4. The assembly according to claim 1, wherein each of said wings has a forward surface, a rearward surface and a perimeter edge extending between said forward surface and said rearward surface, said perimeter edge of each of said wings having an upper side, a lower side, a first side and a second side, each of said forward surface and said rearward surface of each of said wings being concavely arcuate between said first side and said second side.

5. The assembly according to claim 4, wherein:
   said plate has a first lateral side and a second lateral side; and
   said second side of one of said wings being hingedly coupled to said first lateral side of said plate, said first side of one of said wings being hingedly coupled to said second lateral side of said plate.

6. A swimming assembly configured to be worn by an animal thereby improving the animal's ability to swim, said assembly comprising:
   a plurality of fins, each of said fins being configured to be worn on an associated one of legs of an animal when the animal swims, each of said fins comprising
      a plate having a front surface, a back surface and a peripheral edge extending between said front surface and said back surface, said peripheral edge having a top side, a bottom side, a first lateral side and a second lateral side, each of said front surface and said back surface being concavely arcuate between said first lateral side and said second lateral side such that said plate has a U-shaped cross section taken perpendicular to a line extending between said top side and said bottom side, said plate being configured to be positioned against one of the animal's legs having said front surface abutting the animal's leg, said front surface being continuous and smooth extending between said first lateral side and said second lateral side wherein said front surface is configured for being positioned against the animal without catching on fur of the animal,
      a strap being attached to said plate, said strap extending between said first lateral side and said second lateral side, said strap being split to define a distal end of each of a first portion and a second portion of said strap with respect to said plate, said distal end of said first portion being matable with said distal end of said second portion wherein said strap is configured to retain said plate on the animal's leg when the animal swims, and
      a pair of wings, each of said wings having a having a forward surface, a rearward surface and a perimeter edge extending between said forward surface and said rearward surface, said perimeter edge of each of said wings having an upper side, a lower side, a first side and a second side, each of said forward surface and said rearward surface of each of said wings being concavely arcuate between said first side and said second side, said second side of one of said wings being hingedly coupled to said first lateral side of said plate, said first side of one of said wings being hingedly coupled to said second lateral side of said plate, each of said wings being positioned in a deployed position having each of said wings extending laterally away from said plate, said rearward surface of each of said wings being configured to capture water when the animal urges the animal's leg rearwardly in the water such that each of said wings is positioned in said deployed position thereby increasing the animal's ability to swim, each of said wings being positioned in a stored position having each of said wings being positioned proximate said strap, each of said wings being configured to be urged into said stored position when the animal urges the animal's leg forwardly in the water thereby reducing resistance of said wings with respect to the water.

\* \* \* \* \*